US006810034B1

(12) United States Patent
Brand (10) Patent No.: US 6,810,034 B1
(45) Date of Patent: Oct. 26, 2004

(54) AUTOMATIC CONVERSION OF TELEPHONE NUMBER TO INTERNET PROTOCOL ADDRESS

(75) Inventor: Joel Brand, Milpitas, CA (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/513,030

(22) Filed: Feb. 25, 2000

Related U.S. Application Data (60) Provisional application No. 60/122,248, filed on Feb. 26, 1999.

(51) Int. Cl.[7] ............................................. H04L 12/66
(52) U.S. Cl. ...................................................... 370/352
(58) Field of Search ................................ 370/352–356, 370/401, 389–395, 381–385, 357, 522; 714/4, 230; 379/114.15, 90.01, 93.07, 219, 88.17, 201.01; 455/417, 555, 439, 406, 462

(56) References Cited

U.S. PATENT DOCUMENTS

| 4,625,081 A | 11/1986 | Lotito et al. | 379/88 |
| 5,058,152 A | 10/1991 | Solomon et al. | 379/67 |

(List continued on next page.)

FOREIGN PATENT DOCUMENTS

| EP | 0 481 683 A2 | 4/1992 | H04Q/7/04 |
| EP | 0 679 005 A1 | 10/1995 | H04M/3/50 |
| EP | 0 856 979 A2 | 8/1998 | H04M/3/50 |
| EP | 0 905 959 A2 | 3/1999 | H04M/7/00 |
| GB | 2 252 014 A | 7/1992 | H04M/1/274 |
| JP | 10079785 | 3/1998 | H04M/1/57 |
| WO | WO 98/09421 | 3/1998 | H04M/3/42 |
| WO | WO 98/09422 | 3/1998 | H04M/3/42 |
| WO | WO 98/11704 | 3/1998 | |
| WO | WO 99/29083 | 6/1999 | H04L/29/12 |

OTHER PUBLICATIONS

T. Yoshida, N. Terashima, "A Conceptual Study of a Voice Conversation Facility in Intelligent NW Voice Mail," May 27–Jun. 1, p. 129–136, Stockholm, Sweden.

(List continued on next page.)

Primary Examiner—Chi Pham
Assistant Examiner—Prenell Jones
(74) Attorney, Agent, or Firm—Haverstock & Owens LLP (57) ABSTRACT

A conversion system and method allows a calling party to transmit a message to a telephone belonging to a recipient party wherein the message is transmitted via an Internet Protocol network. This conversion system and method preferably utilizes an Internet Protocol gateway. The Internet Protocol gateway preferably includes a controller and a database. In use, a telephone number of the recipient party is preferably transmitted to the Internet Protocol gateway from the calling party. Then, the controller preferably directs this telephone number to the database. The database preferably matches the telephone number of the recipient party to an Internet Protocol address which corresponds with the telephone number and returns this corresponding Internet Protocol address to the controller. Finally, the Internet Protocol gateway responds to the conversion system and method by returning the Internet Protocol address. This conversion system and method then contacts an appropriate server associated with the Internet Protocol address and transmits the message over the Internet Protocol network. The message is then transmitted from the appropriate server to the telephone number of the recipient party. Once the message is transmitted to the telephone number of the recipient party, a communication link is established between the calling party and the recipient party via the Internet Protocol network. This communication link allows both the calling party and the recipient party to communicate with each other. Further, the Internet Protocol gateway has the messaging capabilities of an Intelligent Network service such as signaling system no. 7 protocol.

21 Claims, 6 Drawing Sheets

U.S. PATENT DOCUMENTS

| | | | |
|---|---|---|---|
| 5,339,352 A | 8/1994 | Armstrong et al. | 379/58 |
| 5,406,616 A | 4/1995 | Bjorndahl | 379/59 |
| 5,471,521 A | 11/1995 | Minakami et al. | 379/88 |
| 5,479,489 A | 12/1995 | O'Brien | 379/67 |
| 5,487,111 A | 1/1996 | Slusky | 379/211 |
| 5,524,147 A | 6/1996 | Bean | 379/265 |
| 5,537,464 A | 7/1996 | Lewis et al. | 379/114 |
| 5,539,807 A | 7/1996 | Ghisler et al. | 379/58 |
| 5,572,579 A | 11/1996 | Orriss et al. | 379/142 |
| 5,577,110 A | 11/1996 | Aquino | 379/201 |
| 5,583,920 A | 12/1996 | Wheeler, Jr. | 379/88 |
| 5,596,573 A | 1/1997 | Bertland | 370/474 |
| 5,625,682 A | 4/1997 | Gray et al. | 379/266 |
| 5,668,863 A | 9/1997 | Bieselin et al. | 379/202 |
| 5,712,903 A | 1/1998 | Bartholomew et al. | 379/89 |
| 5,732,216 A | 3/1998 | Logan et al. | 395/200.33 |
| 5,737,725 A | 4/1998 | Case | 704/260 |
| 5,742,905 A | 4/1998 | Pepe et al. | 455/461 |
| 5,764,746 A | 6/1998 | Reichelt | 379/207 |
| 5,850,629 A | 12/1998 | Holm et al. | 704/260 |
| 5,896,441 A | 4/1999 | Akazawa et al. | 379/9 |
| 5,922,045 A | 7/1999 | Hanson | 709/206 |
| 5,970,133 A | 10/1999 | Salimando | 379/88 |
| 5,995,613 A | 11/1999 | Goel et al. | 379/221 |
| 6,016,336 A | 1/2000 | Hanson | 379/88.23 |
| 6,061,432 A | 5/2000 | Wallace et al. | 379/88.18 |
| 6,078,655 A | 6/2000 | Fahrer et al. | 379/209 |
| 6,084,892 A * | 7/2000 | Benash et al. | 370/701 |
| 6,125,126 A * | 9/2000 | Hallenst.ang.l | 370/522 |
| 6,163,855 A * | 12/2000 | Shrivastava et al. | 714/4 |
| 6,167,119 A | 12/2000 | Bartholomew et al. | 379/88.04 |
| 6,185,288 B1 * | 2/2001 | Wong | 379/219 |
| 6,199,076 B1 | 3/2001 | Logan et al. | 707/501 |
| 6,226,289 B1 * | 5/2001 | Williams et al. | 370/385 |
| 6,229,880 B1 | 5/2001 | Reformato et al. | 379/88.01 |
| 6,233,234 B1 * | 5/2001 | Curry et al. | 370/356 |
| 6,233,315 B1 | 5/2001 | Reformato et al. | 379/88.01 |
| 6,282,270 B1 | 8/2001 | Porter | 379/88.17 |
| 6,289,090 B1 | 9/2001 | Tessler et al. | 379/207 |
| 6,317,484 B1 | 11/2001 | McAllister | 379/88.02 |
| 6,330,308 B1 | 12/2001 | Cheston, III et al. | 379/88.04 |
| 6,381,325 B1 | 4/2002 | Hanson | 379/218.01 |
| 6,389,126 B1 | 5/2002 | Bjornberg et al. | 379/201.03 |
| 6,400,804 B1 | 6/2002 | Bilder | 379/76 |
| 6,424,647 B1 * | 7/2002 | Ng et al. | 370/352 |
| 6,427,002 B2 | 7/2002 | Campbell et al. | 379/88.01 |
| 6,442,169 B1 * | 8/2002 | Lewis | 370/401 |
| 6,456,700 B1 | 9/2002 | Malik | 379/88.19 |
| 6,493,438 B1 | 12/2002 | Gross et al. | 379/114.22 |
| 6,650,737 B2 | 11/2003 | Finnigan | 379/88.02 |
| 6,731,625 B1 * | 5/2004 | Eastep et al. | 370/352 |

Deixler, Lyle, "Iwatsu's New ADIX–S, This starter phone system can grow with your company", Mar. 1997, p. 44–45, Teleconnect, vol. 15, Issue 3.

Chung–Hsien Wu, et al., "Speech Activated Telephony Email Reader (SATER) Based on Speaker Verification and Text–To–Speech Conversion", Institute of Information Engineering, IEEE Transactions on Consumer Electronics, vol. 43, No. 3, Aug. 1997, pp. 707–716.

Cristina Delogu, et al., "Spectral Analysis of Synthetic Speech and Natural Speech with Noise Over the Telephone Line", Istituto Superiore Poste e Telecommunicazioni, v.le Europa 190, 00144 Roma, p. 1409–1412.

Masanobu Abe, et al., "A New Framework to Produce Multimedia Content by Combining Synthesized Speech and Moving Pictures in the WWW Environment", NTT Cyber Space Labs, Japan, 1999, pp. 611–616.

* cited by examiner

AUTOMATIC CONVERSION OF TELEPHONE NUMBER TO INTERNET PROTOCOL ADDRESS

RELATED APPLICATIONS

This application claims priority under 35 U.S.C. § 119(e) of the co-pending U.S. provisional application Ser. No. 60/122,248 filed on Feb. 26, 1999 and entitled "Automatic Conversion of Telephone Number to Internet Protocol Address." The provisional application Ser. No. 60/122,248 filed on Feb. 26, 1999 and entitled "Automatic Conversion of Telephone Number to Internet Protocol Address" is also hereby incorporated by reference.

FIELD OF THE INVENTION

This invention relates to the field of telecommunications communications systems. More particularly, this invention relates to the field of telecommunications systems employing the Internet Protocol network.

BACKGROUND OF THE INVENTION

The Internet Protocol network (also collectively known as the "Internet") has steadily increased in popularity as a way for users to broadcast and receive information to and from other parties. Presently, transmission of information relating to audio, textual, and/or graphical data over the Internet is quite common either through electronic mail or websites. Further, this transmission of information is typically received by a computer. Transmission of information over the Internet is often times faster compared to conventional mail and more cost effective compared toll telephone calls utilizing land lines.

There is a growing need to provide audio communication over the Internet which alerts a recipient party through a conventional telephone of an incoming audio communication and also allows the recipient party to send and receive the audio communication through the conventional telephone. Presently, there are solutions which are based on localized look up tables (databases) that contain a telephone number and a corresponding Internet Protocol address. These localized databases rely on the Internet to transmit the telephone number and the corresponding Internet Protocol address belonging to the recipient.

Being localized and relying solely on the Internet, these localized databases have a variety of disadvantages. First, these localized databases are not a scalable solution because standard interfaces across multiple service providers are not properly defined. Each service provider is free to adopt a localized database using their unique format. Further, because the Internet is not limited by geographical boundaries, standardizing all these localized databases which are maintained and operated by independent service providers are virtually impossible. Second, instead of one centralized database or a group of localized databases which are coupled together, the prior solution utilizing independent, localized databases leads to increased maintenance costs, increased network administration costs, and less efficient resource utilization. Finally, the notion of utilizing independent, localized databases which cannot be coupled together neither allows compatibility with mobile telephone services nor number portability applications.

What is needed is a conversion system that allows a recipient to receive a communication through a conventional telephone wherein the communication is transmitted via the Internet. Further, what is needed is a conversion system that maintains a database which is standardized and remains global. Finally, what is also needed is a conversion system that utilizes the messaging capabilities of an Intelligent Network service such as signaling system no. 7 protocol.

SUMMARY OF THE INVENTION

The present invention is a conversion system and method that allows a calling party to transmit a message to a telephone belonging to a recipient party wherein the message is transmitted via an Internet Protocol network. This conversion system and method preferably utilizes an Internet Protocol gateway. The Internet Protocol gateway preferably includes a controller and a database. In use, a telephone number of the recipient party is preferably transmitted to the Internet Protocol gateway from the calling party. Then, the controller preferably directs this telephone number to the database. The database preferably matches the telephone number of the recipient party to an Internet Protocol address which corresponds with the telephone number and returns this corresponding Internet Protocol address to the controller. Finally, the Internet Protocol gateway responds to the conversion system and method by returning the Internet Protocol address. This conversion system and method then contacts an appropriate server associated with the Internet Protocol address and transmits the message over the Internet Protocol network. The message is then transmitted from the appropriate server to the telephone number of the recipient party. Once the message is transmitted to the telephone number of the recipient party, a communication link is established between the calling party and the recipient party via the Internet Protocol network. This communication link allows both the calling party and the recipient party to communicate with each other. Further, the Internet Protocol gateway has the messaging capabilities of an Intelligent Network service such as signaling system no. 7 protocol.

The present invention provides a conversion system and method which operates within an Intelligent Network service. Additionally, the present invention provides a conversion system and method which automatically transmits a message from a calling party to a telephone of a recipient party through an Internet Protocol network.

DETAILED DESCRIPTION OF THE PREFERRED EMBODIMENT OF THE PRESENT INVENTION

Figure 1A:
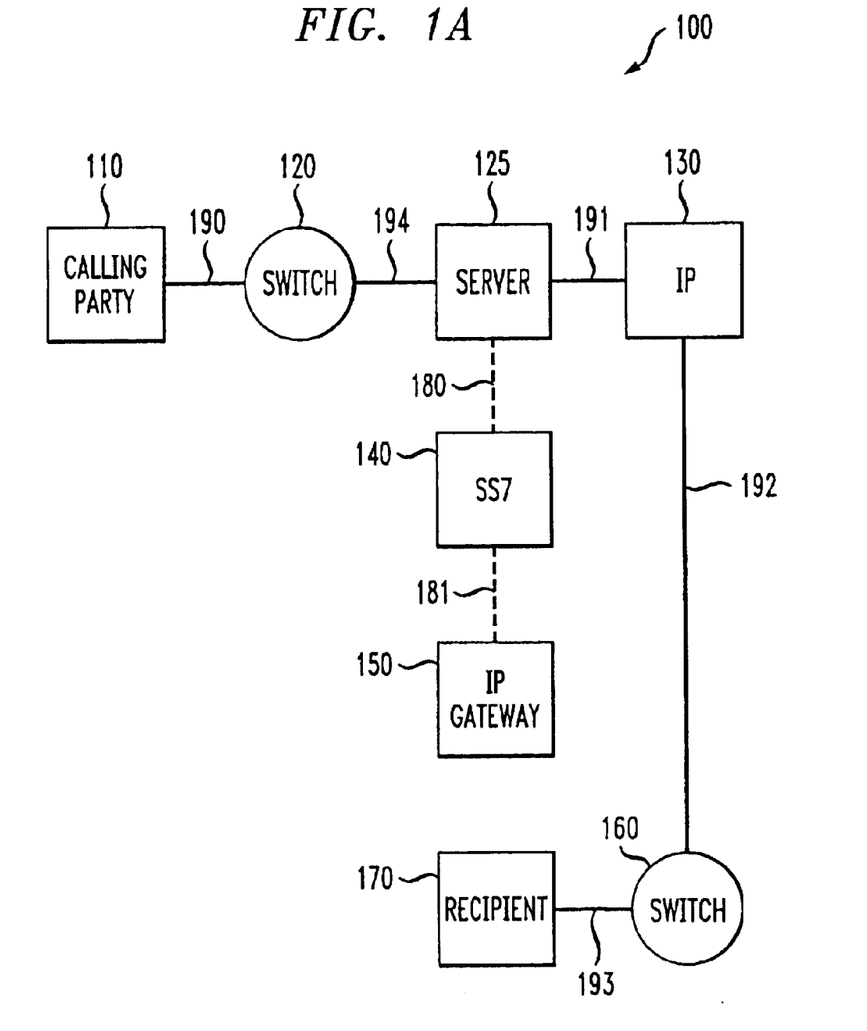
FIG. 1A illustrates a general block diagram showing a telecommunications system containing a preferred embodiment of the present invention.

FIG. 1 illustrates a diagram showing an Intelligent Network system 100 that includes the present invention therein. The present invention is a conversion system which allows a calling party to seamlessly place a call through an Internet Protocol network to a telephone number of a recipient party. Preferably, the present invention automatically matches a corresponding Internet Protocol address with a telephone number and returns the corresponding Internet Protocol address to a control point via a telephone network. The control point then transmits the call to the recipient party through the Internet Protocol network.

The Intelligent Network system 100 includes a calling party 110; switches 120 and 160; a server 125; an Internet Protocol network 130; a signaling system No. 7 (SS7) Network 140; an Internet Protocol gateway 150; a recipient 170; control links 180 and 181; and data links 190, 191, 192, 193, and 194. Portions of the Intelligent Network system 100 are illustrated for exemplary purposes only. For example, it would be apparent to those skilled in the art to utilize any number of switches, servers, Internet Protocol gateways, recipients, and calling parties. In particular, the switches 120 and 160 are service switching points (SSPs), visitor location registers (VLRs), or mobile service switching centers (MSCs), depending on the applications. It would also be apparent to those skilled in the art to utilize appropriate control links, data links, Internet Protocol networks, and SS7 networks to create a functional Intelligent Network.

The calling party 110 and the recipient 170 are preferably situated in remote locations. The switches 120 and 160 preferably act as a coordinator between elements within the Intelligent Network system 100. The calling party 110 is preferably coupled to the switch 120 via the data link 190. The switch 120 is preferably coupled to the server 125 via the data link 194. The server 125 is preferably coupled to the Internet Protocol network 130 via the data link 191. The server is also coupled to the SS7 network 140 via the control link 180. The Internet Protocol network 130 is preferably coupled to the switch 160 via the data link 192. The switch 160 is preferably coupled to the recipient 170 via the data link 193. The SS7 network 140 is preferably coupled to the Internet Protocol gateway 150 via the control link 181.

The control links 180 and 181 provide communication links between the server 125, the SS7 network 140 and the Internet Protocol gateway 150. The data links 190, 191, 192, 193, and 194 provide data links between the calling party 110, the switches 120 and 160, the server 125, the Internet Protocol network 130, and the recipient 170.

Figure 1B:
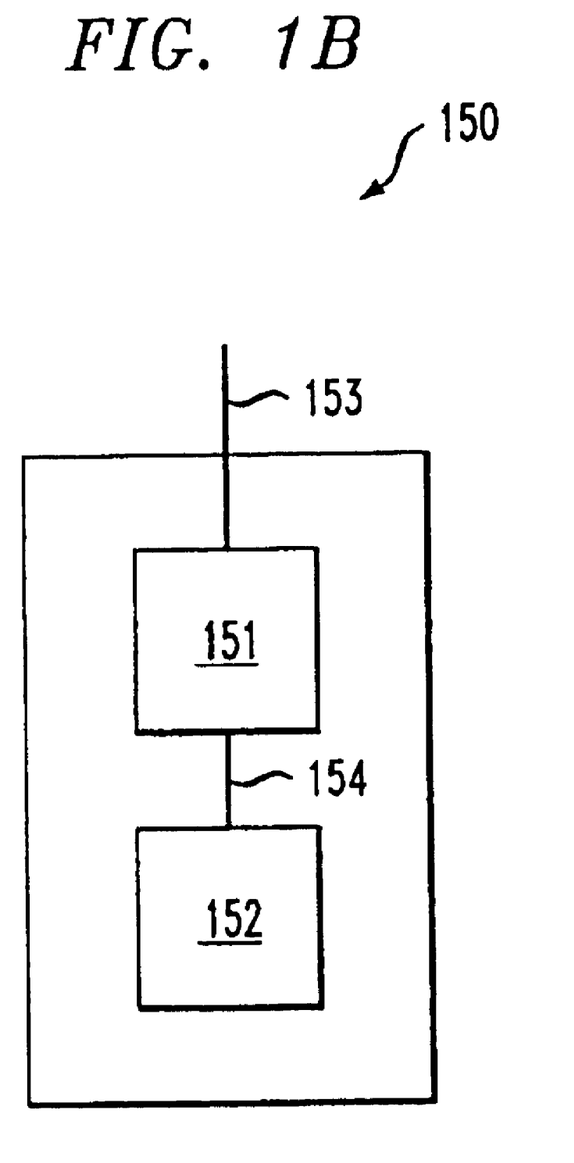
FIG. 1B illustrates a detailed block diagram of an Internet Protocol gateway of the preferred embodiment of the present invention.

FIG. 1B illustrates a detailed block diagram of the Internet Protocol gateway 150. The Internet Protocol gateway 150 preferably includes a controller 151 and a database 152. The Internet Protocol gateway 150 is preferably accessed through the SS7 network 140 (FIG. 1A) by the server 125 (FIG. 1A). The server 125 (FIG. 1A) is preferably coupled to the Internet Protocol gateway 150 through a link 153 which is coupled between the controller 151 and the server 125 (FIG. 1A). The server 125 (FIG. 1A) via the link 153, preferably messages the controller 151 with a telephone number of the recipient. The telephone number of the recipient is preferably recognized by the Internet Protocol gateway 150 as a global title. Further, a sub-system number is preferably attached to the telephone number such that the Internet Protocol gateway 150 is properly instructed to return an Internet Protocol address which corresponds to the telephone number. Preferably, a new sub-system number is assigned to the Internet Protocol gateway 150.

Preferably, the controller 151 is coupled to the database 152 via a link 154. The database 152 preferably contains a plurality of telephone numbers and corresponding Internet Protocol addresses. In response to the telephone number transmitted from the server 125 (FIG. 1A), the Internet Protocol gateway 150 preferably searches for this telephone number within the database and matches this telephone number belonging to the recipient with a corresponding Internet Protocol address. Additionally, the Internet Protocol gateway 150 preferably returns this corresponding Internet Protocol address to the server 125 (FIG. 1A).

The Internet Protocol gateway 150 preferably conforms to standards established by the SS7 protocol. Because the Internet Protocol gateway 150 is compatible with the SS7 network 140, additional Internet Protocol gateways are capable of being added to the Intelligent Network system 100 (FIG. 1A) while retaining communication between each of the Internet Protocol gateways via the SS7 network 140 (FIG. 1A). The database 152 within Internet Protocol gateway 150 and the possible additional Internet Protocol gateways mentioned above are able to be globally updated, modified, and created via the SS7 network 140 (FIG. 1A).

In a first alternate embodiment, multiple Internet Protocol gateways, similar to the Internet Protocol gateway 150 (FIGS. 1A and 1B), are coupled to the SS7 network 140. By utilizing multiple Internet Protocol gateways, there is an increased capacity, flexibility, and assurance of service. In addition, because the multiple Internet Protocol gateways are compatible with the SS7 network 140, the controller 151 and/or the database 152 within each Internet Protocol gateways is capable of being globally updated, modified, and created.

In a second alternate embodiment, the functionality of the Internet Protocol gateway 150 is incorporated into an already addressable existing element within the Intelligent Network system 100 (FIG. 1A) such as a service switching point or a visitor location register. If the Internet Protocol gateway is incorporated into an already addressable existing element, no new sub-system number is required.

Figure 2:
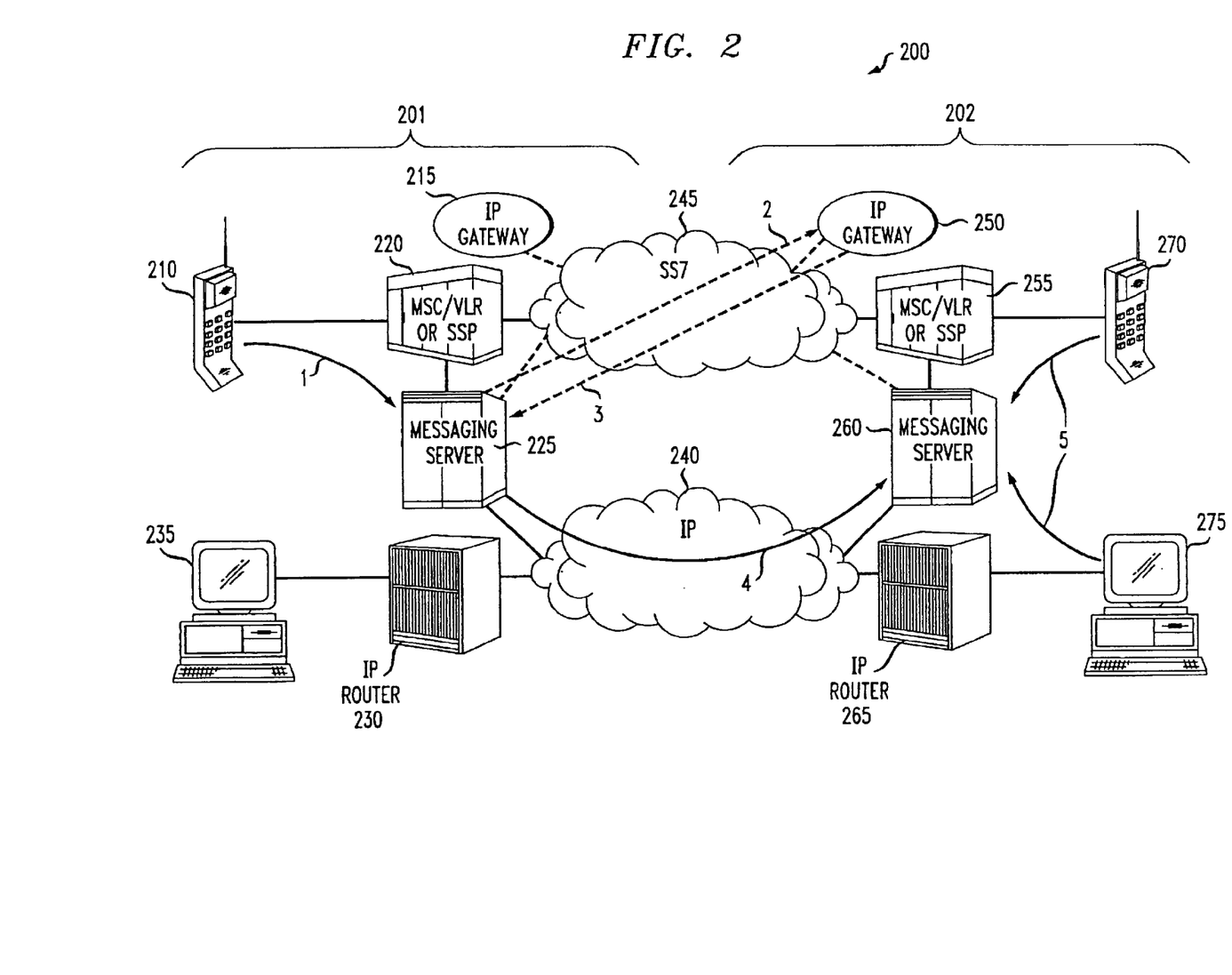
FIG. 2 illustrates a first sample configuration of the preferred embodiment of the present invention.

FIG. 2 illustrates a first sample configuration 200 of the Intelligent Network system 100 (FIG. 1A). The first sample configuration 200 preferably includes a calling party portion 201 and a recipient party portion 202. The calling party portion 201 and the recipient party portion 202 are coupled together via an SS7 network 245 and an Internet Protocol network 240. The calling party portion 201 preferably includes a telephone 210, the Internet Protocol gateway 215, a switch 220, a server 225, an Internet Protocol router 230, and a computer 235. The recipient party portion 202 preferably includes a: telephone 270, the Internet Protocol gateway 250, a switch 255, a server 260, an Internet Protocol router 265, and a computer 275.

The Internet Protocol gateways 215 and 250, the servers 220 and 260, the switch 220, and the switch 255 are similar to the Internet Protocol gateway 150 (FIG. 1A), the server 125 (FIG. 1A), the switch 120 (FIG. 1A), and the switch 160 (FIG. 1A), respectively.

Portions of the first sample configuration 200 are illustrated for exemplary purposes only. For example, it would be apparent to those skilled in the art to utilize any number of switches, servers, Internet Protocol gateways, recipients, and calling parties. In particular, the first sample configuration 200 can have more than one recipient party portion 202.

By utilizing the first sample configuration 200, a calling party, by either utilizing the telephone 210 or the computer 235, is preferably capable of transmitting a message to a recipient party via the telephone 270 over the Internet Protocol network 240. This message includes voice messages, audible messages containing 4data, and the like.

Figure 3:
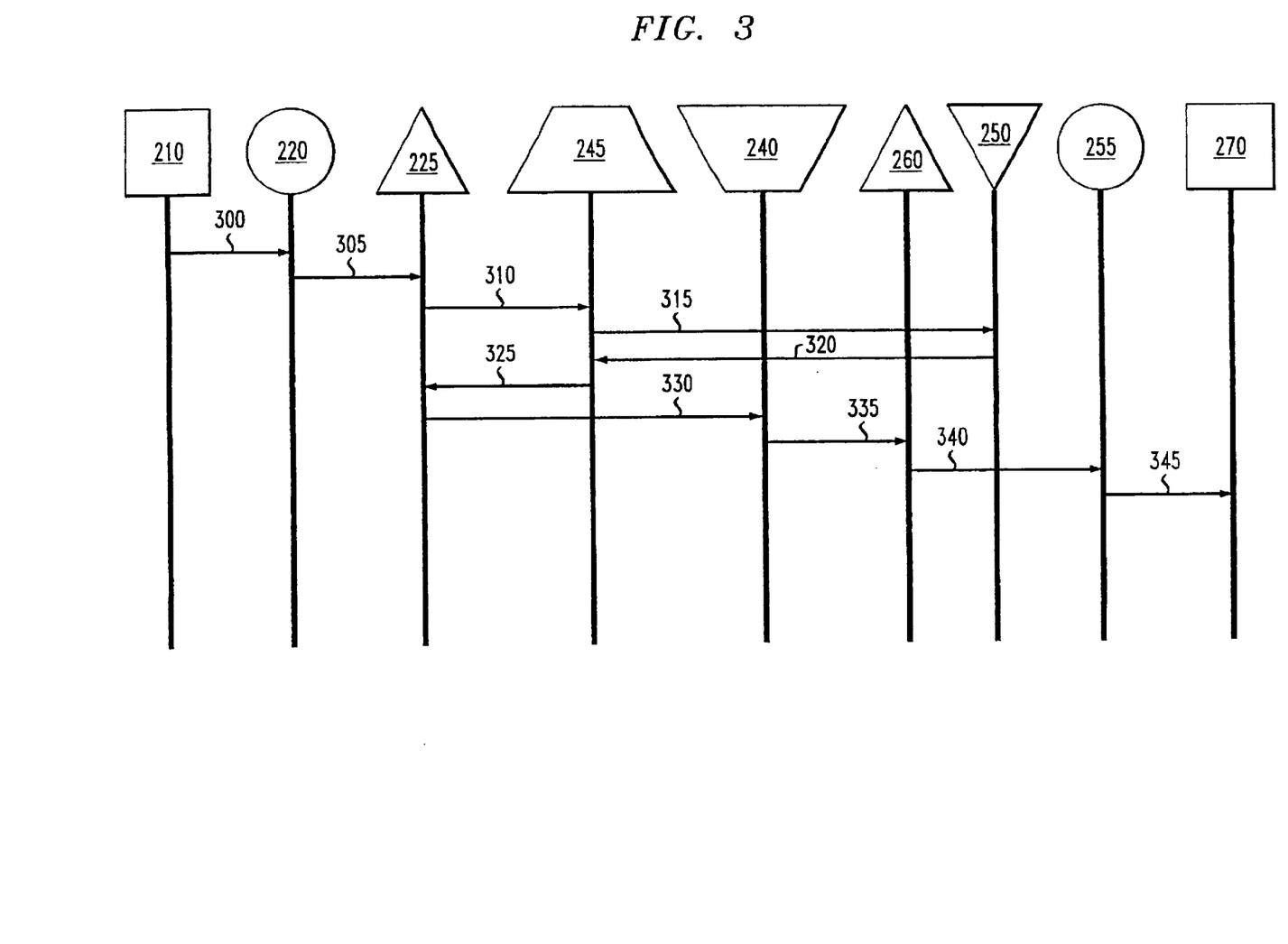
FIG. 3 illustrates a first timing diagram of the first sample configuration of the preferred embodiment.

In FIG. 3, a timing diagram illustrates interaction between the telephone 210, the Internet Protocol gateway 250, the switch 220, the server 225, the Internet Protocol network 240, the SS7 network 245, the server 260, the switch 255, and the telephone 270. First, at the step 300, the calling party dials a telephone number which corresponds to the recipient party and desires to leave a voice message for the recipient party. Then, the telephone 210 preferably contacts the switch 220 and includes the telephone number of the recipient party. Next, in the step 305, the switch 220 notifies the server 225 that the calling party wishes to reach the recipient party at this telephone number. The server 225 then interfaces with the SS7 network 245 in the step 310 and transmits the telephone number of the recipient party. In the step 315, the SS7 network 245 messages the Internet Protocol gateway 250 and submits a request to the Internet Protocol gateway with the telephone number of the recipient party. Next, the Internet Protocol gateway 250 then matches a corresponding Internet Protocol address to the telephone number of the recipient party.

Next, in the step 320, the Internet Protocol gateway 250 contacts the SS7 network 245. Then, in the step 325, the SS7 network 245 returns the corresponding Internet Protocol address belonging to the recipient party to the server 225. Next, the server 225 preferably contacts the Internet Protocol network 240 in the step 330. The Internet Protocol network 240 then preferably contacts the server 260 in response to the corresponding Internet Protocol address belonging to the recipient party in the step 335. The server 260 preferably services the same geographic area of the recipient party. Next, the server 260 contacts the switch 255 in response to instructions from the server 260 in the step 340. Finally, the switch 255 preferably couples with the telephone 270 belonging to the recipient party in the step 345.

As a result, a communication link is established between the recipient party through the telephone 210 and the calling party through the telephone 270. This communication link allows both the recipient party and the calling party to communicate with each other. The calling party and the recipient party are able to exchange voice messages, data encoded messages, and the like. Further, the communication link utilizes the Internet Protocol network 240 as a conduit to pass information between the calling party and the recipient party.

It will be apparent to those skilled in the art that steps may be deleted or substituted with other steps and that other steps may be-added without changing the scope of the present invention as described in FIGS. 2 and 3.

Figure 4:
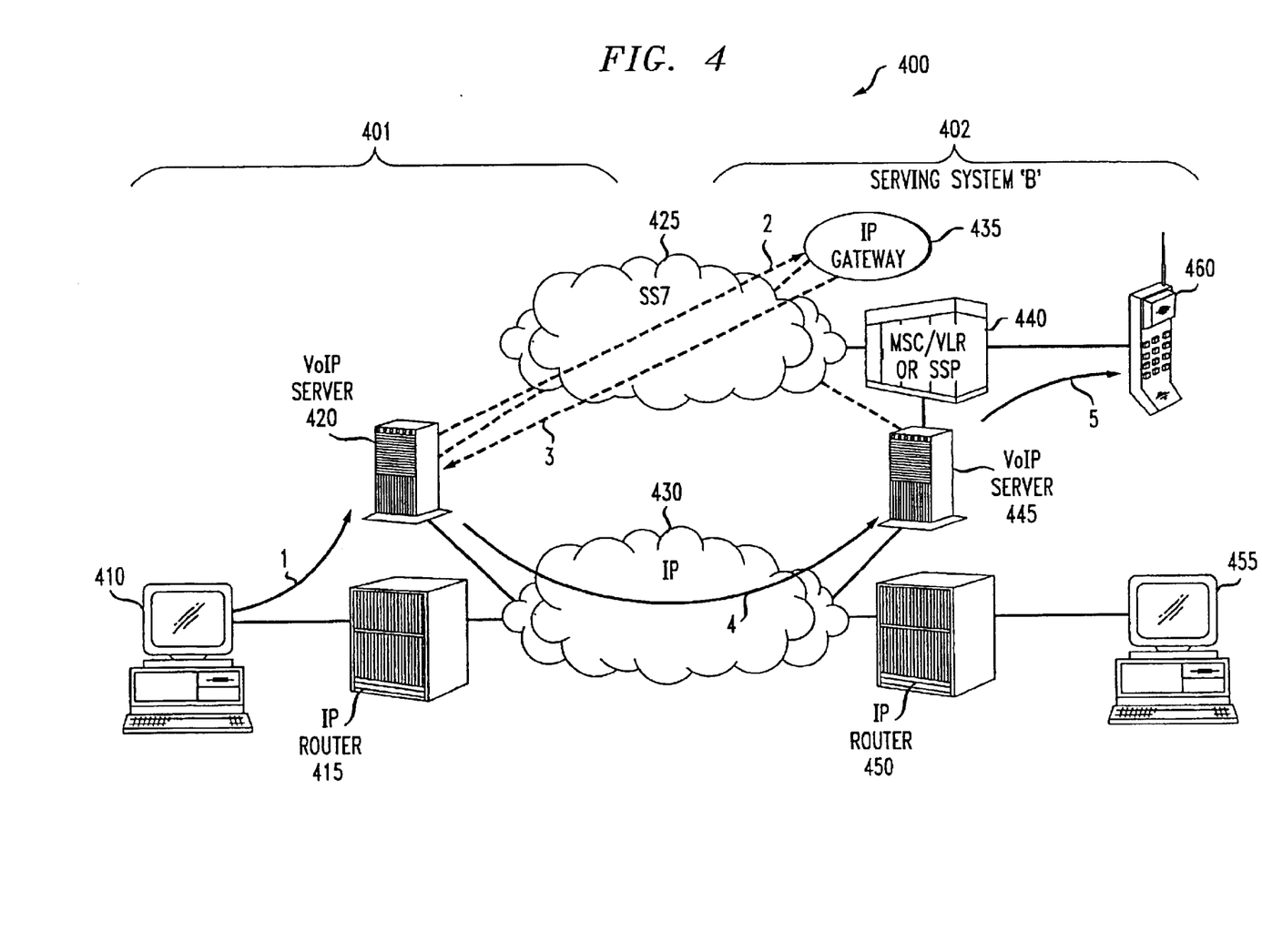
FIG. 4 illustrates a second sample configuration of the preferred embodiment of the present invention.

FIG. 4 illustrates a second sample configuration 400 of the Intelligent Network system 100 (FIG. 1A). The second sample configuration 400 preferably includes a calling party portion 401 and a recipient party portion 402. The calling party portion 401 and the recipient party portion 402 are coupled together via an SS7 network 425 and an Internet Protocol network 430. The calling party portion 401 preferably includes a computer 410, a server 420, and an Internet Protocol router 415. The recipient party portion 402 preferably includes a telephone 460, an Internet Protocol gateway 435, a switch 440, a server 445, an Internet Protocol router 450, and a computer 455. The Internet Protocol gateway 435, the servers 420 and 445, the switch 440, are similar to the Internet Protocol gateway 150 (FIG. 1A), the server 125 (FIG. 1A), and the switch 120 (FIG. 1A), respectively.

Portions of the second sample configuration 400 are illustrated for exemplary purposes only. For example, it would be apparent to those skilled in the art to utilize any number of switches, servers, Internet Protocol gateways, recipients, and calling parties. In particular, the second sample configuration 400 can have more than one recipient party portion 402.

By utilizing the second sample configuration 400, a calling party, by operating the computer 410, is preferably capable of transmitting a message to a recipient party via the telephone 460 over the Internet Protocol network 430.

Figure 5:
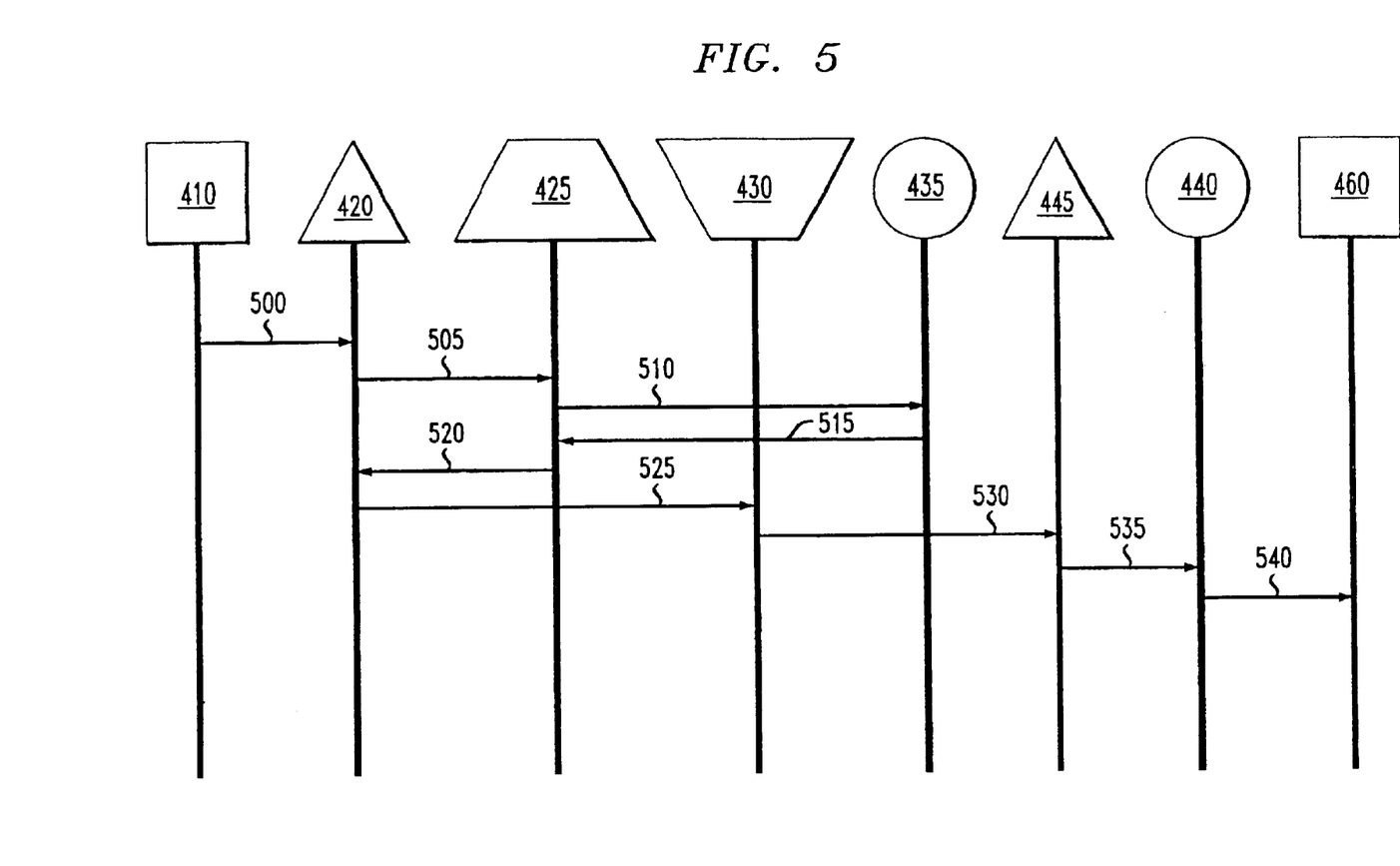
FIG. 5 illustrates a second timing diagram of the second sample configuration of the preferred embodiment.

In FIG. 5, a timing diagram illustrates interaction between the computer 410, the server 420, the SS7 network 425, the Internet Protocol network 430, the Internet Protocol gateway 435, the switch 440, the server 445, and the telephone 460. First, at the step 500, the calling party dials a destination telephone number which corresponds to the recipient party and desires to leave a message for the recipient party. Then, the computer 410 preferably contacts the server 420 and includes the destination telephone number of the recipient party. Next, in the step 505, the server 420 preferably then interfaces with the SS7 network 425 and transmits the destination telephone number of the recipient party. In step 510, the SS7 network 425 messages the Internet Protocol gateway 435 and submits a request to the Internet Protocol gateway 435 with the destination telephone number of the recipient party. Next, the Internet Protocol gateway 435 then matches a corresponding Internet Protocol address to the destination telephone number of the recipient party.

Next, in the step 515, the Internet Protocol gateway 435 contacts the SS7 network 425. Then, in the step 520, the SS7 network 425 returns the corresponding Internet Protocol address belonging to the recipient party to the server 420. Next, the server 420 preferably contacts the Internet Protocol network 430 in the step 525. The Internet Protocol network 430 then preferably messages the server 445 in response to the corresponding Internet Protocol address belonging to the recipient party in the step 530. The Internet Protocol network 530 preferably utilizes the particular server 445, because the server 445 preferably services the same geographic area of the recipient party. Next, the server 445 contacts the switch 440 in response to instructions from the server 445 in the step 535. Finally, the switch 440 preferably couples with the telephone 460 belonging to the recipient party in the step 540.

As a result, a communication link is established between the recipient party through the telephone 460 and the calling party through the computer 410. This communication link allows both the recipient party and the calling party to communicate with each other. Further, the communication link utilizes the Internet Protocol network 430 as a conduit to pass information between the calling party and the recipient party.

It will be apparent to those skilled in the art that steps may be deleted or substituted with other steps and that other steps may be added without changing the scope of the present invention as described in FIGS. 4 and 5.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiments chosen for illustration without departing from the spirit and scope of the invention.

Specifically, it will be apparent to one of ordinary skill in the art that the device of the present invention could be implemented in several different ways and the bookmark system and method disclosed above is only illustrative of the preferred embodiment of the invention and is in no way a limitation.

What is claimed is:

1. A system for transmitting a message over an Internet Protocol network from an calling party to a telephone number of a recipient party, the system comprising:
   a. a database for storing the telephone number of the recipient party and a corresponding IP address;
   b. a control point coupled to the Internet Protocol network and the calling party; and
   c. a telephone network coupled between the control point and the database and configured to return the corresponding IP address to the control point, wherein the database is configured to receive the telephone number and match the corresponding IP address, further wherein the control point is configured to coordinate obtaining the corresponding IP address from the database via the telephone network and transmitting the message to the recipient party over the Internet Protocol network.

2. The system according to claim 1 wherein the control point is a server.

3. The system according to claim 1 wherein the database adheres an SS7 protocol.

4. The system according to claim 1 wherein the data base is configured to be modified globally.

5. The system according to claim 1 wherein the telephone network utilizes an SS7 protocol.

6. A method of seamlessly placing a message originating from a calling party through an Internet Protocol network to a telephone number of a recipient party, the method comprising the following steps:
   a. inputting the telephone number of the recipient party via an input device, wherein the input device is coupled to the Internet Protocol network;
   b. transmitting the telephone number to a control point, wherein the control point is coupled to the input device, the Internet Protocol network, and a telephone network;
   c. querying a gateway with the telephone number of the recipient via the telephone network wherein the gateway is coupled to the telephone network;
   d. providing an IP address corresponding to the telephone number of the recipient to the control point; and
   e. forwarding the message over the Internet Protocol network to the telephone number of the recipient party.

7. The method according to claim 6 further comprising matching the telephone number of the recipient party to the IP address via a database within the gateway.

8. The method according to claim 7 further comprising globally updating the database via the telephone network.

9. The method according to claim 6 wherein the gateway adheres to and is compatible with an SS7 protocol.

10. The method according to claim 6 wherein the telephone network utilizes an SS7 Protocol.

11. The method according to claim 6 wherein the input device is a computer.

12. The method according to claim 6 wherein the input device is a telephone.

13. A method of transmitting a call through an Internet Protocol network to a telephone destination, the method comprising the following steps:
   a. transmitting a telephone number from a control point to a database via a telephone network, wherein the telephone number corresponds to the telephone destination;
   b. matching a corresponding IP address to the telephone number via the database;
   c. returning the corresponding IP address to the control point via the telephone network; and
   d. completing the call originating from a calling party to the telephone destination via the Internet Protocol network.

14. The method according to claim 13 wherein the telephone network is based on an SS7 protocol.

15. The method according to claim 13 further comprising updating the telephone number and the corresponding IP address within the database.

16. The method according to claim 13 further comprising selecting the database from a plurality of databases in response to the telephone number.

17. The method according to claim 16 wherein the plurality of databases are coupled to the telephone network and adhere to an SS7 protocol.

18. The method according to claim 16 further comprising globally modifying the plurality of databases via the telephone network.

19. A method of establishing a communications link between an input device of a calling party and a telephone of a recipient party, the method comprising the following steps:
   a. transmitting a telephone number from the input device to a control point, wherein the telephone number is configured to correspond to the telephone of the recipient party;
   b. transmitting the telephone number from the control point to a gateway via a telephone network;
   c. converting the telephone number into a corresponding Internet Protocol address;
   d. returning the corresponding Internet Protocol address to the control point via the telephone network; and
   e. connecting the input device and the telephone of the recipient party via the Internet Protocol network.

20. The method according to claim 19 further comprising matching the telephone number to the corresponding Internet Protocol address within a database.

21. The method according to claim 20 wherein the database adheres to an SS7 protocol.

* * * * *

UNITED STATES PATENT AND TRADEMARK OFFICE
CERTIFICATE OF CORRECTION

PATENT NO. : 6,810,034 B1
DATED : October 26, 2004
INVENTOR(S) : Joel Brand

It is certified that error appears in the above-identified patent and that said Letters Patent is hereby corrected as shown below:

Title page,
Item [56], References Cited, U.S. PATENT DOCUMENTS, add the following:
-- 6,185,204    02/2001    Voit    370/352 --

Column 4,
Line 45, replace "includes a: telephone 270" with -- includes a telephone 270 --.
Line 65, replace "containing 4data" with -- containing data --.

Signed and Sealed this

Eighteenth Day of January, 2005

JON W. DUDAS
*Director of the United States Patent and Trademark Office*